US005263762A

United States Patent [19]

Long et al.

[11] Patent Number: 5,263,762

[45] Date of Patent: Nov. 23, 1993

[54] VEHICLE WITH SLIDING DOOR CONTACT CLOSURE SENSOR

[75] Inventors: Joseph D. Long, Waterford; Robert S. Strother, St. Clair Shores; John F. Mitchener, Troy; Gary D. Bree, Clarkston, all of Mich.

[73] Assignee: General Motors Corporation, Detroit, Mich.

[21] Appl. No.: 17,576

[22] Filed: Feb. 16, 1993

[51] Int. Cl.⁵ .......................... B60J 5/06; E05F 15/00

[52] U.S. Cl. .......................... 296/146.4; 49/280; 49/360

[58] Field of Search .............. 296/146 A; 49/280, 360

[56] References Cited

U.S. PATENT DOCUMENTS

| | | | |
|---|---|---|---|
| 4,862,640 | 9/1989 | Boyko et al. | 49/280 X |
| 4,984,385 | 1/1991 | DeLand | 49/280 |
| 5,018,303 | 5/1991 | Koura et al. | 49/280 |
| 5,025,591 | 6/1991 | Deland et al. | 49/360 |
| 5,063,710 | 11/1991 | Schap | 49/280 |
| 5,105,131 | 4/1992 | Schap | 49/280 X |
| 5,144,769 | 9/1992 | Koura | 49/360 |
| 5,155,937 | 10/1992 | Yamagishi et al. | 49/280 |

OTHER PUBLICATIONS

1991 *Oldsmobile Silhouette Service Manual,* Aug. 1990, pp. 8A-114-0 to 8A-114-2.

1991 *Pontiac Grand Am Service Manual,* Apr. 27, 1990, pp. 8A-86-0 to 8A-86-1.

*Primary Examiner*—Robert R. Song
*Attorney, Agent, or Firm*—Robert M. Sigler

[57] ABSTRACT

A vehicle such as a van has a sliding door movable between open and closed positions. An electric power source, a door drive switch and electric door drive apparatus are connected in series on the vehicle body to move the door when the switch is closed. Contacts on the vehicle body and door engage as the door nears its closed position; and the door contacts are connected through circuitry, such as an unlatch motor armature, having a first resistance. One of the body contacts is connected to ground and the other is connected, through circuitry including a resistor of greater resistance than the unlatch motor armature, to a junction of the door drive switch and the electric door drive apparatus. An output terminal connected between the resistor and the other body contact provides a signal voltage having different levels depending on engagement of the body and door contacts. The resistor may be connected to the other body contact through an activating switch for the unlatch motor, in its non-activated condition, with the output terminal connected therebetween, so as to isolate the output terminal from transients generated during unlatch motor activation.

8 Claims, 4 Drawing Sheets

VEHICLE WITH SLIDING DOOR CONTACT CLOSURE SENSOR

BACKGROUND OF THE INVENTION

The field of this invention is the control of electrically driven doors on motor vehicles: in particular, electrically driven, sliding doors for vans. Sliding vehicle doors of the prior art, which are primarily manually moved, generally have no permanent electrical connection, such as by wires or sliding electrical contacts, to the vehicle body. Electric power for door mounted power lock or unlatch actuators is only required when the door is closed and is thus provided through contacts on the body and door which engage as the door enters its closed position. The contacts on the vehicle body or door may be of the type including spring loaded plungers which are compressed as the door nears its closed position. These plungers can generate a force opposing door closing, due to the compressed springs, which might be misinterpreted by a power door closing system as an obstruction and thus prevent the door from being completely closed and latched. Therefore, it may be desired to provide a signal when contact is first made between the door and body mounted power contacts so that power door closing can be completed and the door securely latched. More generally, it may be desired to provide a signal of door closure, either to the vehicle operator or to the power door closing system; and detection of contact engagement may provide such a signal.

SUMMARY OF THE INVENTION

The existence of electrical apparatus, including body and door mounted contacts, for providing electrical activation of motors or actuators in the door by an electric power source on the vehicle body provides an opportunity for generating a signal on the vehicle body when those contacts close. This invention provides such a door contact closure signal at minimal cost by modifying the existing circuitry on the vehicle body.

The vehicle of the invention comprises a body having a door movable between open and closed positions, an electric power source on the vehicle body having first and second terminals, first and second body contact means in predetermined spatial relationship on the body, with the second body contact means being connected to the second terminal of the electric power source, and first and second door contact means in predetermined spatial relationship on the door so as to contact the first and second body contact means, respectively, as the door nears its closed position.

The vehicle further comprises first circuit means connecting the first and second door contacts to establish an electrically conductive path therebetween having a first resistance, electric drive means on the body adapted to drive the door to its closed position, and a door drive switch connected in series with the electric drive means and the electric power source for controlling activation of the latter, the door drive switch being connected to the first terminal of the electric power source.

The vehicle finally comprises second circuit means, including a series resistor with a second resistance greater than the first resistance, connected from a junction of the door drive switch and the electric drive means to the first body contact, and an output terminal between the series resistor of the second circuit means and the first body contact.

With the door drive switch closed, as it will be during power door closing operation, and the body and door contact means not in engagement, the output terminal will provide a door contact open signal comprising essentially the voltage of the first terminal of the electric power source. When the body and door contacts engage, however, the first and second resistances will form a voltage divider to provide a door contact closed signal comprising a voltage on the output terminal closer to that of the second terminal of the electric power source. The door drive switch, therefore, performs two functions in the circuit, since, when (1) it is opened to deactivate the door drive means, (2) it also prevents parasitic current flow through the resistor of the signal generating apparatus and thus saves energy and prevents battery drain while the door driving apparatus is not in use. The door contact closed signal is obtained with minimal extra cost, since most elements of the circuit would be used on such a door driving apparatus without the signal generation.

In a preferred embodiment of the invention, the first circuit means comprises the armature of an unlatch motor associated with a door mounted latch mechanism. The greater resistance of the resistor prevents undesired activation of the unlatch motor by series current through the resistor and motor armature. Desired activation of the unlatch motor is obtained through an unlatch switch, with the resistor being connected to the first body contact means through the unlatch switch in its deactivated condition. During activation of the unlatch motor, the output terminal is disconnected from the unlatch motor circuit and is therefore unresponsive to voltage noise generated therein. The system may be designed with a separate ground contact for the unlatch motor or, if the door further includes a lock motor, with grounding through the lock motor contacts and activation circuit.

Further details and advantages of this invention will be apparent from the claims and following description of a preferred embodiment.

DESCRIPTION OF THE PREFERRED EMBODIMENT

Figure 1:
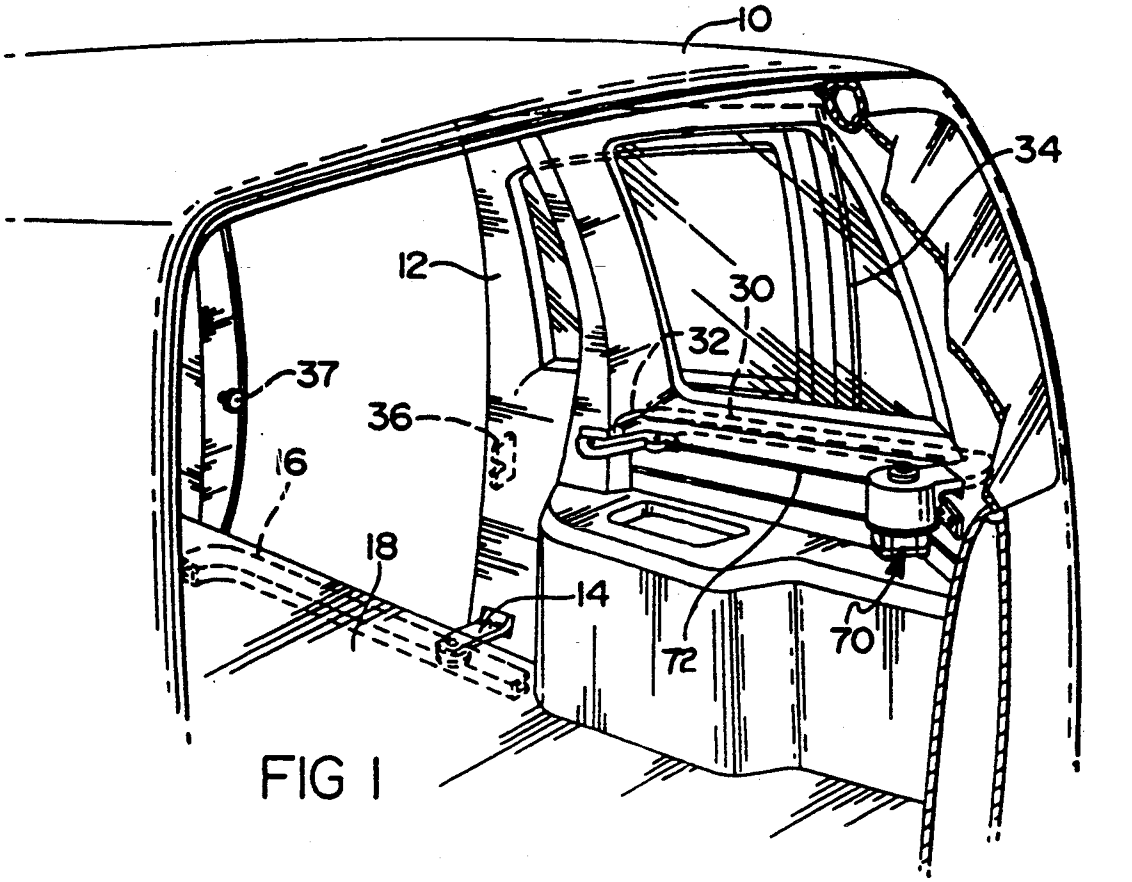
FIG. 1 is a perspective view of a vehicle interior showing the general arrangement of a sliding door with a power door closing mechanism.

FIG. 1 is a partial perspective view of a van type motor vehicle body 10 in which a door 12 is mounted for fore and aft sliding movement. An arm 14 reaches inboard at the bottom of door 12 and carries a roller which rides in a lower track 16 concealed beneath a floor 18. Likewise, an upper arm, not shown, reaches inboard from door 12 and carries rollers which roll in an upper track 30 mounted on the side of body 10. FIG. 1 shows door 12 in an open position. Forward sliding movement of door 12 is enabled by the travel of the door mounted rollers within lower track 16 and upper track 30. Each of these tracks is curved inwardly at the forward end thereof so that the door glides inwardly to close the door opening as the door reaches a fully closed position. Powered movement of door 12 between open and closed positions is provided by a motor drive mechanism 70 through cables, one of which is shown at 72, which cables are attached to door 12. A sealing weatherstrip 34 is carried on door 12 and compresses against body 10 when the door reaches the closed position. A door latch apparatus 36 is carried by door 12 and latches with a striker 37 mounted on body 10 to latch door 12 in the closed position. A more complete description of the mechanical apparatus of FIG. 1 is found in U.S. Pat. No. 5,046,283, issued to Compeau et al on Sept. 10, 1991.

Figure 2:
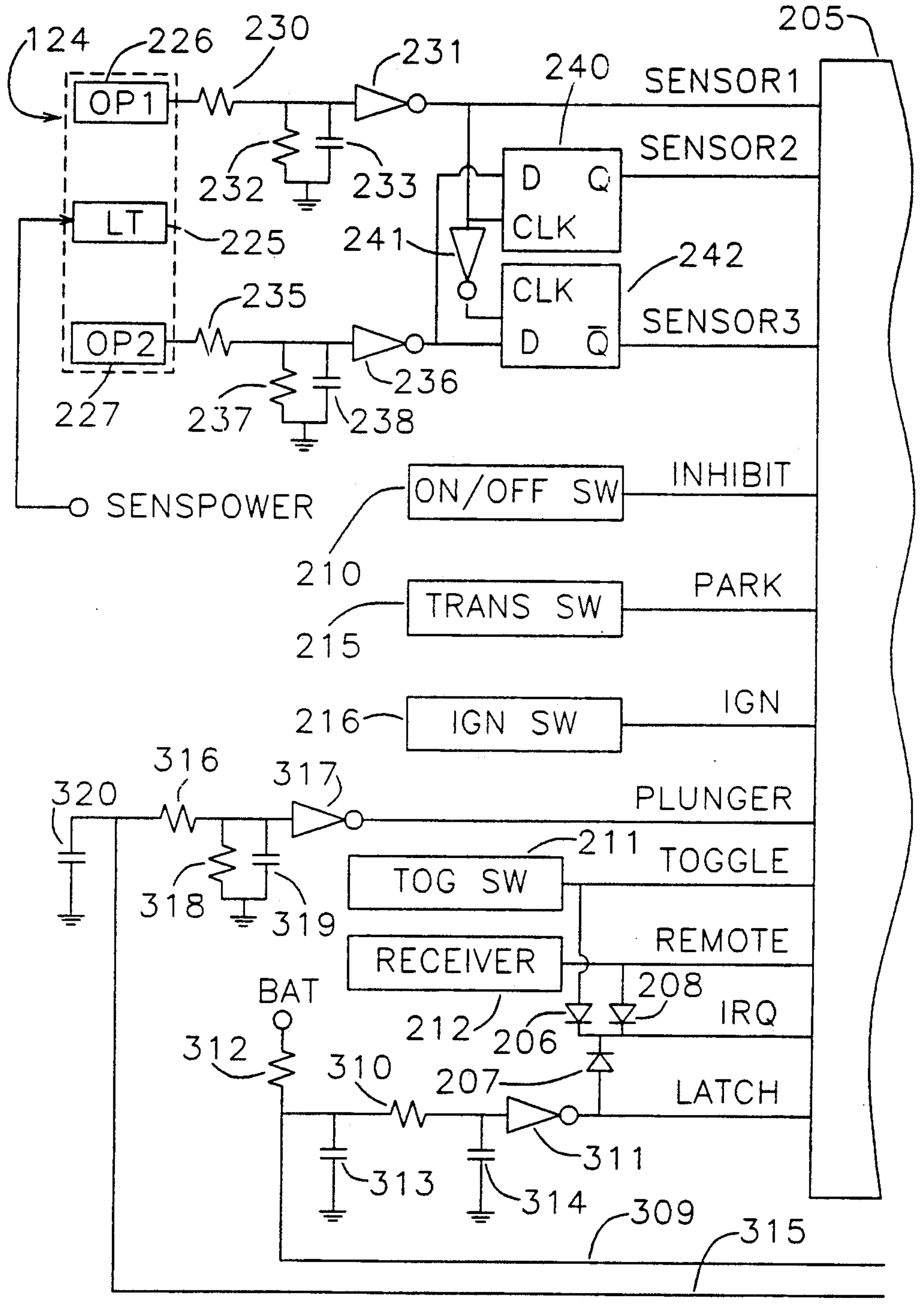
FIGS. 2 and 3 are mixed block/circuit diagrams of a control for the power door closing mechanism of FIG. 1 including a first embodiment of door closure signal generating apparatus according to this invention.
Figure 3:
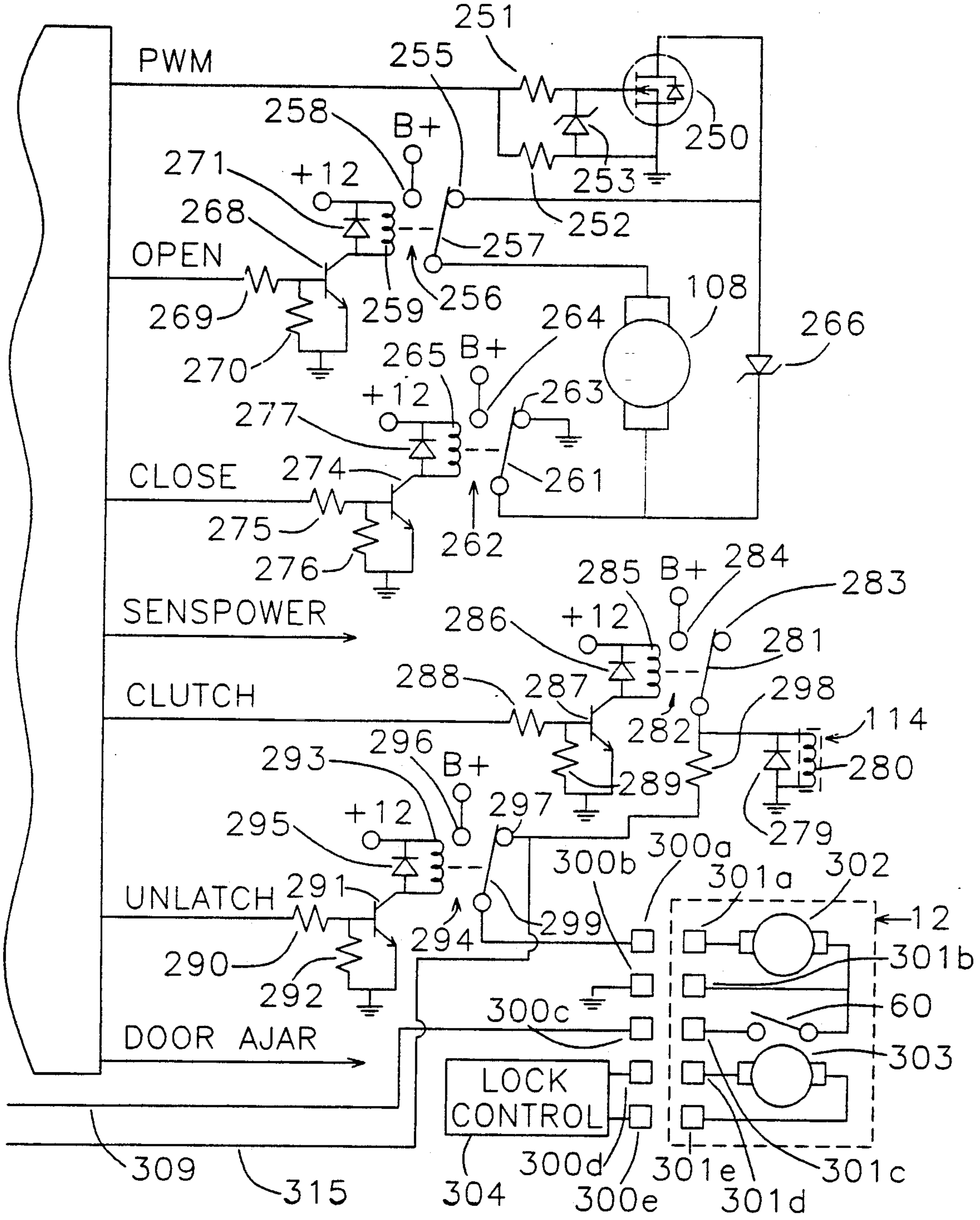

Referring to FIGS. 2 and 3, a programmed digital processor 205 may be, for example, a Motorola (R) MC68HC05C4, which comprises a single chip microcomputer including CPU, RAM, ROM and I/0 apparatus. Standard connections for an external crystal, watchdog circuit, etc. are not shown, as they will be well known to those using such processors; however, input and output connections specific to this system are shown and identified, with inputs in FIG. 2 and outputs in FIG. 3.

Referring specifically to FIG. 2, an ON/OFF switch 210 provides a binary INHIBIT input signal to processor 205. The ON/OFF switch may be located conveniently to a vehicle operator and its INHIBIT signal is used to enable or inhibit operation of the powered door operating apparatus. A toggle switch (TOG SW) 211 provides a binary input signal TOGGLE to processor 205. Toggle switch 211 may be located within the vehicle near door 12 conveniently to a person desiring to open door 12 from inside the vehicle. Alternatively, or in addition, a toggle switch 211 may be located conveniently to a vehicle operator. The TOGGLE input is used to initiate powered operation of door 12 in either the open or close directions or, in some circumstances, to reverse door direction under the control of an operator. A RECEIVER 212 receives a remote door opening or closing signal from a transmitter outside the vehicle by infrared, electromagnetic or other radiation and generates a binary REMOTE input to processor 205 which is used similarly to the TOGGLE input. Examples of such remote opening systems are well known in the art; and RECEIVER 212 may include known decoding means for use in generation of the REMOTE signal.

Processor 205 includes an interrupt IRQ input which, when it receives a predetermined voltage change, generates an interrupt request within processor 205. At least one use of such a request in this system is to "wake up" the processor to its full function from a "sleep" state in which many system functions are suspended to save power, etc. when door closing is not desired. Toggle switch 211 and RECEIVER 212 are each connected to the IRQ input, through isolating diodes 206 and 208 respectively, so as to initiate such a "wake up" of the system upon their activation.

A transmission switch (TRANS SW) 215 provides a binary PARK input to processor 205 to indicate when the vehicle transmission is in a mode providing no vehicle movement, such as the park condition of a standard vehicle automatic transmission. The PARK signal is used to allow powered door operation when the vehicle is not moving and prevent open operation when the vehicle is moving or potentially moving. An ignition switch (IGN SW) 216 provides a binary IGN signal to processor 205 to indicate the ignition switch condition. A LATCH input provides signals to processor 205 which can be interpreted to indicate the status of latch 36 of door 12. The LATCH input is also connected through an isolating diode 207 to the IRQ input to provide a "wake up" function when latch 36 of door 12 changes its latch condition. A PLUNGER input to processor 205 provides a binary indication of contact between electric contacts in the main portion of vehicle body 10 and door 12, as will be further explained at a later point in this specification.

Sensor 124 is provided with an internal light source (LT) 225 which provides light under the control of a signal SENSPOWR. Sensor 124 further comprises two light sensors 226 (OP1) and 227 (OP2) arranged with light source 225 and a rotatable slotted disk, not shown, in a standard quadrature detector arrangement so that, for example, if the slotted disk comprises alternating solid and open sections of equal arc, while sensor 226 is in the middle of a solid section, sensor 227 is on the border between solid and open sections. Such an arrangement provides signals which can be interpreted to sense rotational speed (or position) and direction. Sensor 124 is mounted stationary with rotatable slotted disk 122 fixed for rotation with a member of the motor drive mechanism 70.

Light sensor 226 is connected through a series resistor 230 (4.7 K) to an inverting buffer 231, with a resistor 232 (100 K) and capacitor 233 (100 pF) connected in parallel to ground from the input of buffer 231. Likewise, light sensor 227 is connected through a series resistor 235 (4.7 K) to an inverting buffer 236, with a resistor 237 (100 K) and capacitor 238 (100 pF) connected in parallel to ground from the input of buffer 236. The output of buffer 231 provides a SENSOR1 input to processor 205 and is connected directly to the CLK input of a flip-flop 240 and through an inverter 241 to the CLK input of a flip-flop 242. Although not shown, the R and S inputs of flip-flops 240 and 242 are grounded. The output of buffer 236 is connected to the D inputs of flip-flops 240 and 242. The Q output of flip-flop 240 provides an input SENSOR2 to processor 205; while the NOTQ output of flip-flop 242 provides an input SENSOR3 to processor 205. SENSOR1 provides a pulse signal which can be interpreted by processor 205 to indicate rotational position, and therefore speed, of a member of motor drive mechanism 70, and therefore of door 12. SENSOR2 and SENSOR3 provide pulse signals indicating movement direction with greater resolution than that provided by a single direction signal, so that direction reversal can be sensed sooner.

Figure 5:
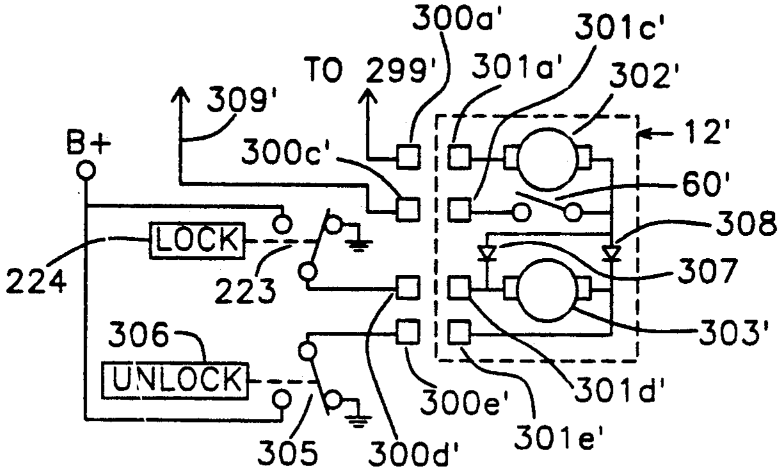
FIG. 5 is a circuit diagram of a variation of the apparatus of FIGS. 2 and 3 including a second embodiment of door closing signal generating apparatus.

Referring to FIG. 3, the SENSPOWR signal which controls light source 225 in FIG. 5 is generated as a binary output of processor 205. In addition, a DOORAJAR signal may be generated by processor 205 when door 12 is open. This signal can be used, if desired, to activate a door ajar lamp or similar warning signal.

A PWM output from processor 205 is used to control a 50 amp power FET 250. The binary PWM signal is connected through a resistor 251 (1 K) to the gate of FET 250 and through a resistor 252 (10 K) to ground. The source of FET 250 is grounded and its gate is protected by a 5.1 volt zener diode 253 connected to ground.

The drain of FET 250 is further connected to the normally closed contact 255 of a relay 256 having an armature 257, a normally open contact 258 connected to voltage B+, and an activating coil 259. Armature 257 of relay 256 is connected through the armature circuit of an electric motor 108 to an armature 261 of a relay 262 having a grounded normally closed contact 263, a normally open contact 264 connected to voltage B+, and an activating coil 265. Motor 108 is a drive motor for door 12 which is included within motor drive mechanism 70, along with a clutch 114. A protective zener diode 266 is connected between armature 261 of relay 262 and normally closed contact 255 of relay 256.

An activating circuit for relay 256 comprises an NPN transistor 268 having a grounded emitter, a base receiving a binary OPEN output signal through a resistor 269 (470 ohm) from processor 205 and a collector connected through activating coil 259 to voltage +12. The activating circuit further comprises a resistor 270 (680 ohm) from the base of transistor 268 to ground and a freewheeling diode 271 across activating coil 259. Likewise, an activating circuit for relay 262 comprises an NPN transistor 274 having a grounded emitter, a base receiving a binary CLOSE output signal through a resistor 275 (470 ohm) from processor 205 and a collector connected through activating coil 265 to voltage +12. This activating circuit further comprises a resistor 276 (680 ohm) from the base of transistor 274 to ground and a freewheeling diode 277 across activating coil 265.

A high OPEN output of processor 205 will activate relay 256 to provide +12 volts through armature 257 and drive motor 108 in the door opening direction (however, door 12 is driven only when clutch 114 is activated, as described below). Alternatively, with relay 262 activated by the CLOSE signal from processor 205, motor 108 is connected in series with FET 250 to run in the opposite, door closing direction. Processor 205 may thus control motor 108 in the door closing direction by its PWM output: providing continuous or pulse width modulated control.

Clutch 114 is electromagnetically actuated and includes an activating coil 280, which is connected between ground and an armature 281 of a relay 282. A freewheeling diode 279 is connected across coil 280. Relay 282 further comprises a normally closed contact 283, a normally open contact 284 connected to voltage B+ and an activating coil 285 with a parallel freewheeling diode 286. An activating circuit for relay 282 comprises an NPN transistor 287 having a grounded emitter and a base connected to a CLUTCH output of processor 205 through a resistor 288 (470 ohm) and to ground through a resistor 289 (680 ohm). Activating coil 285 is connected between a collector of transistor 287 and voltage B+. The CLUTCH output of processor 205 activates clutch 114 through the circuit described above.

An UNLATCH output of processor 205 is connected through a resistor 290 (470 ohm) to the base of an NPN transistor 291 having a grounded emitter and a resistor 292 (680 ohm) connected from its base to ground. A collector of transistor 291 is connected to B+ through the activating coil 293 of a relay 294 and a parallel freewheeling diode 295. Relay 294 further comprises a normally open contact 296 connected to voltage B+, a normally closed contact 297 connected through a resistor 298 (470 ohm) to armature 281 of relay 282, and an armature 299. Relay 294 is used to control an electrically powered unlatch motor 302 for latch apparatus 36.

Latch apparatus 36 is located in the movable door 12; however, there is no source of electric power in door 12. Therefore, electric power and communication is provided to door 12 only in its closed position. A set of five stationary electrical contacts 300*a*–300*e* are disposed in the door frame of body 10 for contact by a set of five spring-loaded, plunger-type electrical contacts 301*a*–301*e* on door 12. Each of plunger contacts 301*a*–301*e* is aligned to contact the corresponding one of stationary contacts 300*a*–300*e* essentially simultaneously as the closing door nears its closed position; and each compresses against its internal spring force as door 12 fully closes. Stationary contact 300*a* is connected to armature 299 of relay 294; and stationary contact 300*b* is connected to ground. In door 12, unlatch motor 302, which activates the unlatch mechanism, is connected between plunger contacts 301*a* and 301*b*. Latch switch 60 is connected between plunger contact 301*c* and the junction of plunger contact 301*b* and unlatch motor 302. Door 12 may also include a power lock apparatus with a lock/unlock motor 303 connected between plunger contacts 301*d* and 301*e*. A standard LOCK CONTROL apparatus 304 in body 10 is connected to stationary contacts 300*d* and 300*e* and is capable of being activated to provide current in one direction to motor 303 in order to lock door 12 and in the opposite direction to motor 303 in order to unlock door 12.

Stationary contact 300*c* is connected through line 309 (continued in FIG. 2), resistor 310 (100 K) and inverting buffer 311 to the LATCH input of processor 205. Stationary contact 300*c* is further connected through a resistor 312 (470 ohm) to voltage BAT, and through a capacitor 313 (220 pF) to ground. A capacitor 314 (0.01 uF) is connected to ground from the input of inverting buffer 311. The plunger contacts 301*a*–301*e* are engaged with the stationary contacts 300*a*–300*e* through a small range of movement of door 12 adjacent its closed position.

In order to determine when the plunger contacts 301*a*–301*e* are in contact with stationary contacts 300*a*–300*e*, the PLUNGER input to processor 205 is generated by the following circuitry. Normally closed contact 297 of relay 294 in FIG. 3 is connected through line 315 (continued in FIG. 2), resistor 316 (100 K) and inverting buffer 317 to the PLUNGER input of processor 205. A resistor 318 (180 K) and capacitor 319 (0.01 uF) are connected in parallel to ground from the input of inverting buffer 317; and a capacitor 320 (220 pF) is connected from line 315 to ground.

In operation, as door 12 is closing, clutch apparatus 114 is activated by relay 282; and line 315 is thus connected to voltage B+ through resistor 298 and armature 281 and normally open contact 284 of relay 282. Before plunger contacts 301*a* and 301*b* contact stationary contacts 300*a* and 300*b*, a high voltage—essentially B+—is provided on line 315 to processor 205. When these plunger contacts and stationary contacts engage, however, line 315 is connected to ground through normally closed contact 297 and armature 299 of relay 294, contacts 300*a* and 301*a*, the armature of unlatch motor 302, and contacts 301*b* and 300*b*. The armature of unlatch motor 302 has a low resistance typical of electric motor armatures, typically the few ohms of the armature windings and commutator brushes. The 470 ohm resistance of resistor 298 forms a voltage divider with the much smaller armature resistance of unlatch motor 302 with line 315 as the output; and the voltage provided to processor 205 from line 315 thus falls to near ground level. Thus the PLUNGER signal changes to indicate plunger contact. Depending on the length of the plunger contacts 301*a* and 301*b*, this signal could be used to indicate a door closed condition or to give notice of an approach to a door closed condition.

The larger resistance of resistor 298, as compared with the armature resistance of unlatch motor 302, also prevents the latter from being activated by series current through resistor 298 when clutch relay 282 is activated, as it will be while door 12 is being driven closed. Of course, even the small series current through resistor 298 and the armature of unlatch motor 302 would constitute a significant parasitic current loss over a long period of time. However, this does not occur, since the sensor current is provided through clutch relay 282 in its activated condition and will cease when clutch relay 282 is deactivated. Thus, current flow through the sensor circuit is stopped when the door is not being driven. Clutch relay 282 thus provides a double function: it enables the plunger sense circuit while it also enables clutch operation. It is a specific embodiment of a door drive activating switch and is the preferred embodiment in the circuit as shown. In some door drive circuit arrangements, a door drive motor operating relay could alternatively be used.

In addition, although stationary contact 300*a* could be connected directly to resistor 298, the connection through armature 299 and normally closed contact 297 of relay 294 as shown provides an additional advantage and is preferred. With this arrangement, when unlatch motor 302 is activated at the beginning of door opening, the PLUNGER line is disconnected from the unlatch circuit to avoid conducting noise from relay 294 or unlatch motor 302 to processor 205.

FIG. 5 shows an alternative embodiment which uses only 4 contacts between body 10 and door 12, rather than the 5 contacts of the previous embodiment. The circuit of FIG. 5 should be understood as a modification of a portion of the circuit of FIG. 3, with corresponding parts numbered similarly and primed.

The embodiment of FIG. 5 does not include the separate ground contacts 300*b* and 301*b* of FIG. 3. Instead, the ground side of unlatch motor 302′ is connected through a diode 307 to door contact 301*d*′ and through a diode 308 to door contact 301*e*′. Body contact 300*d*′ is connected to the armature of a standard power lock relay 223 having a grounded normally closed contact, a normally open contact connected to power supply B+, and a power lock relay activating apparatus 224. Likewise, body contact 300*e* is connected to the armature of a standard unlock relay 305 having a grounded normally closed contact, a normally open contact connected to power supply B+, and a power unlock activating apparatus 306. Since the standard power lock activating apparatus 224 and power unlock activating apparatus 306 are designed in such a way as to prevent simultaneous activation of both relays 223 and 305, one of body contacts 330*d*′ and 300*e*′ will always provide a ground path for the door closure sensing circuitry, even if one of the relays 223 and 305 is activated; and the diodes 307 and 308 will isolate the sensor circuitry from high voltages applied to motor 303′ during door locking and unlocking. Thus, a pair of contacts between body 10 and door 12 may be eliminated, if desired, at the price of an additional diode voltage drop in the unlatch motor activating circuit. If the consequent reduction in operating voltage to unlatch motor 302′ is of no consequence, additional cost may thus be saved with this embodiment.

Figure 6:
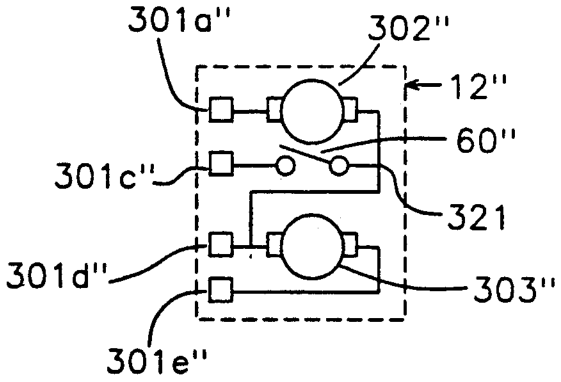
FIG. 6 is a circuit diagram of a variation of the apparatus of FIG. 5.

FIG. 6 shows a further variation of the circuit of FIG. 5. Only the door portion is shown, since the body portion of the circuit is identical to that shown in FIG. 5. Door contacts 301*a*″, 301*c*″, 301*d*″ and 301*e*″ contact spaced body contacts, not shown but identical to body contacts 300*a*′, 300*c*′, 300*d*′ and 300*e*′ of FIG. 5, as door 12″ nears its closed position. The armature of a door lock/unlock motor 303″ is connected between door contacts 301*d*″ and 301*e*″. The armature of an unlatch motor 302″ is connected in series with a detent switch 60″ between door contacts 301*a*″ and 301*c*″. Junction 321 of motor 302″ and detent switch 60″ is connected directly to one only of door contacts 301*d*″ and 301*e*″, preferably 301*d*″. This variation of the circuit additionally saves the cost of 2 diodes over that of FIG. 5 but does not always guarantee a ground connection for the sensor circuit or the detent switch circuit. For example, if the connection is made to door contact 301*d*″, junction 321 will see B+ rather than ground when lock activating apparatus 224 activates relay 223 to provide power to lock/unlock motor 303″. However, some vans are provided with a timed lock feature, wherein activation of lock activating apparatus 224 is prevented while the door is open and for some period of time after it closes. If such a feature is provided, lock activation will be prevented, and ground thus provided to junction 321, whenever the door is open, as it always will be when the door contact closure signal (or a detent signal from switch 60″) is expected. This is why door contact 301*d*″ is preferred for the connection to junction 321 in this embodiment. However, if junction 321 is connected to door contact 301*e*″, it will still be grounded except when door unlock activating apparatus 306 is activating relay 305. This is an unlikely event while the door is nearing its closed position; and the door control can be designed to allow for the possibility, should it occur.

Figure 4:
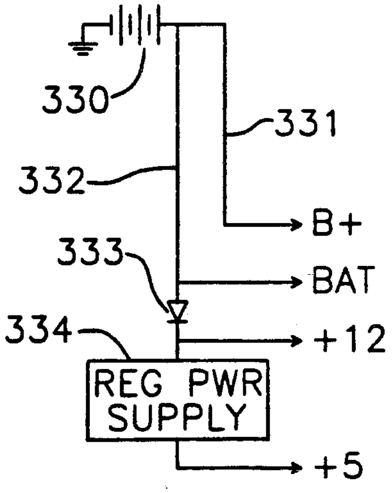
FIG. 4 is a circuit diagram of electrical power supply apparatus for the control of FIGS. 2 and 3.

FIG. 4 shows power supply apparatus for generating the various voltages used in the apparatus of FIGS. 2, 3 and 5. A standard vehicle electrical power system, including battery, alternator, voltage regulator, etc., is represented by battery 330 having a grounded terminal and a hot (+) terminal. The hot terminal of battery 330 is connected by a significantly long, heavy gage wire 331 to a terminal B+, to which all parts of the circuits in this description labeled B+ are connected. This terminal is used to supply the heavy power needs of motors, clutch coil, etc. Voltage B+ is the standard vehicle voltage—nominally 12 volts—dropped slightly when heavy currents are flowing through wire 331. A similarly long but lighter gage wire 332 connects the hot terminal of battery 330 to a terminal labeled BAT. The voltage on terminal BAT is also derived directly from the standard vehicle supply voltage of battery 330 but is not as much affected by the motor and clutch activating currents through wire 331. A diode 333 connects terminal BAT to a terminal +12, which provides the same voltage as BAT but with reverse voltage protection. This voltage is used to prevent damage to the NPN transistors (and other electronic components as described herein) if battery 330 is connected backward to the system. Finally, the +12 terminal is connected through a standard solid state voltage regulator circuit 334 to a terminal labeled +5, from which a regulated 5 volts is obtained for solid state electronic circuit components such as inverting buffers.

The embodiments of the invention in which an exclusive property or privilege is claimed are defined as follows:

1. A vehicle comprising, in combination:

a body having a door movable between open and closed positions;

an electric power source on the vehicle body having first and second terminals;

first and second body contact means in predetermined spatial relationship on the body, the second body contact means being connected to the second terminal of the electric power source;

first and second door contact means in predetermined spatial relationship on the door so as to contact the first and second body contact means, respectively, as the door nears its closed position;

first circuit means connecting the first and second door contacts to establish an electrically conductive path therebetween having a first resistance;

electric drive means on the body adapted to drive the door to its closed position;

a door drive switch connected in series with the electric drive means and the electric power source for controlling activation of the former by the latter, the door drive switch being connected to the first terminal of the electric power source;

second circuit means including a series resistor with a resistance greater than the first resistance, the second circuit means being connected from a junction of the door drive switch and the electric drive means to the first body contact; and an output terminal between the series resistor of the second circuit means and the first body contact to provide a door contact closure signal when the door drive switch is closed to activate the door drive means and the first and second door contact means engage the first and second body contact means.

2. The vehicle of claim 1 in which the electric drive means comprises an activating coil of an electromagnetic clutch.

3. The vehicle of claim 1 in which the first circuit means comprises an armature of an unlatch motor adapted to activate a latch mechanism on the door.

4. The vehicle of claim 2 in which the first circuit means comprises an armature of an unlatch motor adapted to activate a latch mechanism on the door.

5. The vehicle of claim 3 in which the second terminal of the electric power source is connected to vehicle ground, the second body contact means comprises a first contact connected to vehicle ground and the second door contact means comprises a second contact connected through the armature of the unlatch motor to the first door contact means.

6. The vehicle of claim 3 in which the second terminal of the electric power source is connected to vehicle ground, the second door contact means comprises third and fourth contacts, a door lock motor armature is connected between the third and fourth contacts, the second body contact means comprises fifth and sixth contacts adapted to contact the third and fourth contacts, respectively, a first door lock switch is adapted to connect the fifth contact to vehicle ground when deactivated and to the first terminal of the electric power source when activated, a second door lock switch is adapted to connect the sixth contact to vehicle ground when deactivated and to the first terminal of the electric power source when activated, and the first circuit means further connects the armature of the unlatch motor to one of the third and fourth contacts.

7. The vehicle of claim 6 in which the first circuit means connects the armature to the third contact through a first diode and to the fourth contact through a second diode.

8. A vehicle comprising, in combination:

a body having a door movable between open and closed positions;

an electric power source on the vehicle body having first and second terminals;

first and second body contact means in predetermined spatial relationship on the body, the second body contact means being connected to the second terminal of the electric power source;

first and second door contact means in predetermined spatial relationship on the door so as to contact the first and second body contact means, respectively, as the door nears its closed position;

a latch mechanism on the door having an unlatch motor with a motor armature connected electrically between the first door contact means and the second door contact means, the motor armature having a first resistance;

an unlatch switch having a switch armature connected to the first body contact means and movable between a normally closed contact and a normally open contact, the latter being connected to the first terminal of the electric power source;

electric drive means on the body adapted to drive the door to its closed position;

a door drive switch connected in series with the electric drive means and the electric power source for controlling activation of the former by the latter, the door drive switch being connected to the first terminal of the electric power source;

a resistor connected from a junction of the door drive switch and the electric drive means to the normally closed contact of the unlatch switch, the resistor having a second resistance greater than the first resistance; and an output terminal between the resistor and the normally closed contact of the unlatch switch to provide a door contact closure signal when the door drive switch is closed to activate the door drive means, the unlatch switch is deactivated and the first and second door contact means engage the first and second body contact means.

* * * * *